United States Patent Office 2,874,850
Patented Feb. 24, 1959

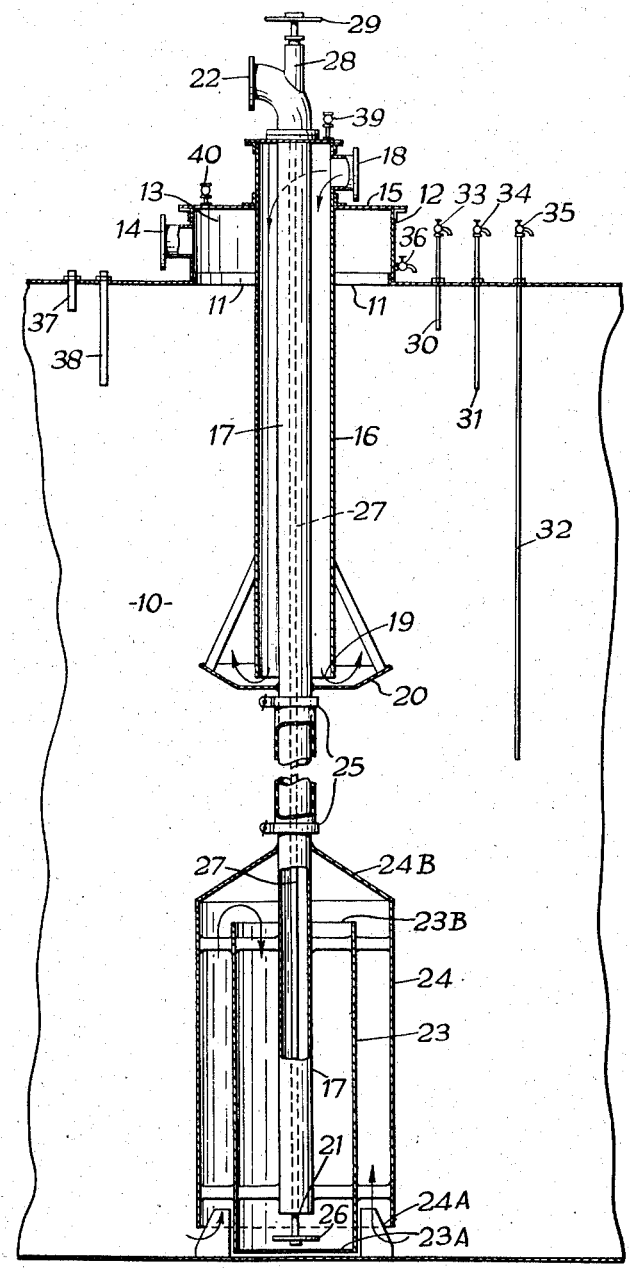

2,874,850

APPARATUS FOR SEPARATING OIL AND WATER

Douglas G. Unthank, London, England, assignor of one-half to Henry Arthur John Silley, London, England Application June 16, 1955, Serial No. 515,887

Claims priority, application Great Britain June 22, 1954

7 Claims. (Cl. 210—519)

This invention is concerned with improvements in and relating to apparatus for separating oil and water, and has for an object to provide such apparatus which can be mounted in a tank, such as a cargo hold of an oil tanker vessel, to form a separator for oil and water.

According to the present invention there is provided apparatus for mounting in a tank to form a separator for oil and water, the apparatus comprising a discharge conduit for separated water which conduit, when mounted in the tank, has one end opening into the tank interior and the other end discharging to the tank exterior, a valve disposed at the said one end of the discharge conduit and operable by an operator outside the tank to permit or prevent passage of liquid from the tank into the conduit, and an inlet conduit to the tank for liquid to be separated, the inlet conduit extending at least approximately parallel to the discharge conduit and discharging at a point intermediate between the ends of the discharge conduit in directions having components which are radial with respect to the longitudinal axis of the inlet conduit.

The said one end of the discharge conduit may extend into a cylinder which, when the apparatus is mounted in a tank, has its lower end closed and its upper end open.

Preferably, the first-mentioned cylinder extends into a second cylinder which, when the apparatus is mounted in a tank has its upper end closed and its lower end open and opening into the tank interior.

The separated water discharge conduit and the first and second cylinders may be of circular cross-section and disposed coaxial with one another.

Preferably, both the separated water discharge conduit and the inlet conduit for liquid to be separated are of circular cross-section and are coaxial with one another. In such a construction in which the inlet conduit surrounds the discharge conduit, the discharge end of the inlet conduit may discharge into a saucer shaped member fixed around the outside of the discharge conduit, the saucer shaped member directing liquid entering the tank radially outwards with respect to the longitudinal axis of the inlet conduit and upwards.

Apparatus embodying the invention will now be described, by way of example, with reference to the accompanying drawing, the apparatus being shown in longitudinal section as mounted in a tank 10 comprising one of the cargo holds of an oil tanker vessel.

The top of the tank is pierced at 11 and a coaming 12 is mounted around the hole thus formed to provide a chamber 13 in which separated oil collects. One wall of the coaming is provided with a discharge port 14 through which separated oil can be discharged from the chamber into a discharge conduit.

The top of the chamber is formed by a cover 15 which can be made removable, in which case means are provided to render the joint between the coaming 12 and the cover 15 liquid-tight. The cover is pierced to receive two conduits 16 and 17 of circular section mounted coaxially one within the other, the outer conduit 16 being fixed to the cover by a liquid-tight joint formed, for example, by welding. The cover 15 forms a mounting flange for conduit 16 and other parts secured thereto.

The outer conduit 16 constitutes an inlet conduit to the tank for liquid to be separated and is provided at its upper end with an inlet port 18. The other end of the conduit terminates in an annular discharge port 19 at a predetermined point slightly below the estimated lowest level of the oil-water interface. The annular port 19 discharges into dispersing means in the form of a saucer-shaped member 20 fixed around the exterior of the inner conduit and directing the liquid entering the tank radially outwards with respect to the longitudinal axis of the inlet conduit and upwards at an angle of about 30°.

The inner conduit 17 constitutes a discharge conduit from the tank 10 for separated water, the end 21 of the conduit within the tank extending nearly to the tank floor, and the other end extending to the tank exterior and providing a discharge port 22 for the separated water. A first cylinder 23 of circular cross-section is mounted around the lower end of the discharge conduit 17 and a second cylinder 24, also of circular cross-section, is mounted around the first cylinder, both the first and second cylinders being coaxial with the longitudinal axis of the discharge conduit 17. The lower end 23A of the first cylinder 23 is closed, and its upper end 23B is open, while the lower end 24A of the second cylinder 24 is open and its upper end 24B is closed.

The part of the discharge conduit 17 between the saucer-shaped member 20 and the closed end 24B of the second cylinder 24 can be flexible and/or provided with quickly detachable connections 25 to enable the apparatus to be used with tanks of different depths and for ease of storage of the apparatus when it is removed from the tank.

The end 21 of the discharge conduit 17 within the tank is provided with a valve than can be opened and closed at will by an operator outside the tank to permit and prevent respectively passage of liquid from the tank into the discharge conduit. In this embodiment the valve comprises a circular plate 26 that is moved toward and away from the mouth of the discharge conduit by a rod 27 which extends upwards through the discharge conduit. The upper end of the rod is screw-threaded and the required axial movement thereof is produced by rotating the rod in a nut 28 by means of a handwheel 29, the nut co-operating with the said screw-threaded upper end of the rod.

The discharge port 22 for separated water from the tank is at a higher level than the inlet port 18 for liquid to be separated. The said inlet port 18 is in turn at a higher level than the discharge port 14 from the tank for separated oil. Test pipes 30, 31 and 32 provided at their upper ends with respective on/off valves 33, 34 and 35 extend to different depths within the tank and enable liquid at different depths within the tank to be withdrawn for its composition to be determined.

A fourth on/off valve 36 is provided in the coaming 12 to enable liquid to be withdrawn from the chamber 13. Alternatively, or in addition, electric detector electrodes 37 and 38 such as capacitor electrodes, may be provided at different depths within the tank, the electrodes being connected to electric apparatus (not illustrated) that enables the nature of the liquid at the respective depths to be determined and operates powered oil and water discharge valves (also not illustrated) as required. After release valves 39 and 40 are provided respectively at the top of the inlet conduit 16 and in the top of the chamber 13.

To operate the separator formed by the apparatus and the tank 10, the tank is first filled with clean water, for example clean sea water, through the water discharge conduit 17, the valve formed by the plate 26 being open. The mixture of oil and water to be separated is introduced into the tank through the inlet conduit 18, the liquid being directed radially outwards and upwards into the tank interior by the said saucer-shaped member 20. The liquids then separate, the oil passing to the top of the tank and thence into the said chamber 13, and the water passing to the bottom of the tank. The water passes beneath the lower edge of the second cylinder 24, upwards in the annular passage between the two cylinders 23 and 24, over the upper edge of the first cylinder 23, downwards in the annular passage between the first cylinder 23, and the discharge conduit 17 and upwards in the discharge conduit. If liquid to be separated is supplied continuously to the tank the separated liquids can be drawn off continuously or intermittently as required. Alternatively, the liquid to be separated may be supplied intermittently and in that case, preferably the oil is discharged by adding sufficient clean water to the tank to displace the oil. Heating coils may be provided in the tank around the apparatus to heat the liquids and assist the separation and also the break-up of any oil-water emulsion that may be present.

When the separation is finished and all the oil discharged, the clean water can be withdrawn from the tank until only the discharge conduit 17 and the first cylinder 23 are left full of water. The valve is closed and the tank can then be filled with a cargo of oil, the valve and the water trap provided by the water-filled first cylinder preventing the oil entering the discharge conduit and contaminating it. When the tank is again filled with fresh water for a separating operation the water is again introduced through the discharge conduit 17, so that the entering water flushes the outer surface of the first cylinder 23 and the inner surface of the second cylinder 24.

The apparatus in accordance with the invention is particularly suited for use with a tank comprising a cargo hold of a tanker vessel. For example, after discharging a cargo of oil some of the tanks are filled with water to serve as ballast while the vessel is on the return journey, this ballast water becoming contaminated with the oil that remains in the tanks. During the return journey the un-occupied tanks are washed with high-pressure jets of water and the washings can be fed to the separator tank to remove the oil therefrom, the water remaining being sufficiently clean to be discharged overboard. The ballast water which is contaminated with oil is then fed to the separator while clean ballast water is fed to one or more of the clean tanks. When the vessel reaches the loading port for a fresh cargo of oil the ballast water in its tanks is sufficiently clean to be discharged overboard within the port.

I claim:

1. Apparatus for separating oil from water, comprising a closed tank, a water discharge conduit passing through the top wall of the tank and having its lower end opening into the tank near the bottom thereof and its upper end forming a water outlet outside of the tank, an inlet conduit surrounding said discharge conduit so as to form with the exterior of the water discharge conduit a substantially annular passage, said inlet conduit having its lower end terminating within said tank at an elevation intermediate between the top and bottom of the tank, the upper end of said inlet conduit extending out of the tank and having an inlet opening outside of the tank for the introduction of oil-contaminated water, dispersing means comprising a baffle substantially co-axial with said annular passage at the lower end of said inlet conduit for discharging oil-contaminated water into said tank radially from the lower end of said annular passage, a valve for closing the lower end of said discharge conduit, and operating means located on the outside of said tank for moving said valve from closed to open position and vice versa.

2. Apparatus according to claim 1 wherein said inlet conduit is open at the bottom end, and said dispersing means comprises a saucer-shaped member secured to said discharge conduit at a point spaced below the lower end of said annular passage between said inlet conduit and said discharge conduit and serving to direct water radially outward into the tank from the discharge end of the said annular passage.

3. Apparatus according to claim 1 and including a cylinder surrounding and connected in substantially co-axial relation with the lower end portion of said discharge conduit, the lower end of the cylinder being closed and the upper end open, and a second cylinder surrounding and connected in substantially co-axial relation with said first-mentioned cylinder and having an open lower end, the upper end of said second cylinder being closed and sealed about said discharge conduit below said dispersing means.

4. Apparatus for mounting in a tank to separate oil from water, the apparatus comprising a separated-water discharge conduit for mounting in a vertical position and having an inlet port at the bottom end and a discharge port at the top end, a valve for closing said discharge conduit at its lower end, an operating rod for said valve extending through said discharge conduit and out of the upper end thereof for operating said valve between open and closed positions, a second conduit surrounding an upper section of said discharge conduit so as to form with the exterior of said discharge conduit a substantially annular passage, said inlet conduit having an inlet port at the upper end thereof for receiving oil-contaminated water, the upper end of said second conduit being sealed around said discharge conduit below the discharge port thereof, means at the lower end of said second conduit in the form of a baffle substantially co-axial with and spaced from the lower end of said annular passage for discharging oil-contaminated water radially from the lower end of said second conduit, and a mounting flange secured to said second conduit near the upper end thereof and below the inlet port thereof.

5. Apparatus according to claim 4 wherein said inlet conduit is open at the bottom end, and said dispersing means comprises a saucer-shaped member secured to said discharge conduit at a point spaced below the lower end of said annular passage between said inlet conduit and said discharge conduit and serving to direct water radially outward into the tank from the open end of the said annular passage.

6. Apparatus according to claim 4 and including a cylinder surrounding and connected in substantially co-axial relation with the lower end portion of said discharge conduit, the lower end of the cylinder being closed and the upper end open, and a second cylinder surrounding and connected in substantially co-axial relation with said first-mentioned cylinder and having an open lower end, the upper end of said second cylinder being closed and sealed about said discharge conduit below said dispersing means.

7. Apparatus for mounting in the opening of a tank to separate oil from water, the apparatus comprising a separated-water discharge conduit for mounting in a vertical position and having an inlet port at the bottom end and a discharge port at the top end, a second conduit surrounding an upper section of said discharge conduit so as to form with the exterior of the water discharge conduit a substantially annular passage and said inlet conduit having an inlet port at the upper end thereof for receiving oil-contaminated water, the upper end of said second conduit being sealed around said discharge conduit below the discharge port thereof, a mounting flange secured to said second conduit near the upper end thereof and below the inlet port thereof, said flange forming a cover for the opening in said tank when the apparatus is mounted in said opening, said annular passage being open at the bottom end, and a saucer-shaped member coaxial with and secured to said discharge conduit at a point spaced below the lower end of said inlet conduit and serving to direct water radially outward into the tank from the open end of the said annular passage.

References Cited in the file of this patent

UNITED STATES PATENTS

| | | |
|---|---|---|
| 1,262,076 | Marston | Apr. 9, 1918 |
| 2,175,563 | Green | Oct. 10, 1939 |
| 2,624,463 | Freese | Jan. 6, 1953 |

FOREIGN PATENTS

| | | |
|---|---|---|
| 41,183 | Germany | Nov. 30, 1887 |
| 28,192 | Australia | 1930 |
| 9,447 | Great Britain | Apr. 18, 1911 |
| 553,379 | Great Britain | May 19, 1943 |